(12) United States Patent
De Smet et al.

(10) Patent No.: US 7,901,789 B2
(45) Date of Patent: Mar. 8, 2011

(54) ALUMINIUM COMPOSITE SHEET MATERIAL

(75) Inventors: Peter De Smet, Sint-Martens-Latem (BE); Marc-Jan De Haas, Apeldoorn (NL)

(73) Assignee: Aleris Aluminum Duffel BVBA, Duffel (BE)

( * ) Notice: Subject to any disclaimer, the term of this patent is extended or adjusted under 35 U.S.C. 154(b) by 0 days.

(21) Appl. No.: 12/297,300

(22) PCT Filed: Apr. 19, 2007

(86) PCT No.: PCT/EP2007/003448
§ 371 (c)(1),
(2), (4) Date: Jan. 12, 2009

(87) PCT Pub. No.: WO2007/128390
PCT Pub. Date: Nov. 15, 2007

(65) Prior Publication Data
US 2009/0169917 A1    Jul. 2, 2009

(30) Foreign Application Priority Data

May 2, 2006  (EP) ..................................... 06009012

(51) Int. Cl.
*B32B 15/01* (2006.01)
*B32B 15/04* (2006.01)
*B32B 15/20* (2006.01)

(52) U.S. Cl. ......... 428/654; 428/650; 428/213; 428/215; 428/332

(58) Field of Classification Search .................. 428/650, 428/654, 213, 215, 332
See application file for complete search history.

(56) References Cited

U.S. PATENT DOCUMENTS

| | | | |
|---|---|---|---|
| 3,857,973 A | 12/1974 | McKee et al. | |
| 5,266,130 A | 11/1993 | Uchida et al. | |
| 5,616,189 A | 4/1997 | Jin et al. | |
| 6,153,854 A | 11/2000 | Haszler et al. | |
| 6,224,992 B1 | 5/2001 | Delbeke et al. | |
| 6,329,075 B1 | 12/2001 | Nener et al. | |
| 6,337,147 B1 | 1/2002 | Haszler et al. | |
| 6,495,269 B1 | 12/2002 | Haszler et al. | |
| 6,528,183 B2 | 3/2003 | Dif et al. | |
| 6,780,259 B2 | 8/2004 | Bull et al. | |
| 6,848,233 B1 | 2/2005 | Haszler et al. | |
| 2002/0031682 A1 | 3/2002 | Dif et al. | |
| 2003/0087122 A1 | 5/2003 | Benedictus et al. | |
| 2004/0045643 A1 | 3/2004 | Hewett et al. | |
| 2005/0011630 A1 | 1/2005 | Anderson et al. | |
| 2006/0185816 A1 | 8/2006 | Anderson et al. | |

FOREIGN PATENT DOCUMENTS

| | | |
|---|---|---|
| CA | 2376273 | 1/2001 |
| EP | 1170118 A1 | 1/2002 |
| EP | 1638715 | 10/2008 |
| FR | 2704557 A1 | 11/1994 |
| FR | 2826979 A1 | 1/2003 |
| FR | 2877877 | 5/2006 |
| GB | 925956 | 5/1963 |
| GB | 1004868 | 9/1965 |
| JP | 59089748 | 5/1984 |
| JP | 61049796 | 3/1986 |
| JP | 63319143 | 12/1988 |
| JP | 6439340 | 2/1989 |
| JP | 05-318147 | * 12/1993 |
| JP | 06-228690 | * 8/1994 |
| JP | 6228691 | 8/1994 |
| JP | 2000129382 A1 | 5/2000 |
| JP | 2004-285391 A1 | 10/2004 |
| WO | 98/24571 A1 | 6/1998 |
| WO | 9824571 | 6/1998 |
| WO | 9828130 | 7/1998 |
| WO | 0026020 | 5/2000 |
| WO | 0054967 | 9/2000 |
| WO | 0102165 | 1/2001 |
| WO | 0156782 | 8/2001 |
| WO | 0238370 | 5/2002 |
| WO | 0240210 | 5/2002 |
| WO | 03006697 | 1/2003 |
| WO | 2004112992 | 12/2004 |
| WO | 2006053701 | 5/2006 |
| WO | 2007128389 | 11/2007 |
| WO | 2007128391 | 11/2007 |

OTHER PUBLICATIONS

Machine Translation, Kikuchi et al., JP 06-228690, Aug. 1994.*
Machine Translation, Matsuo et al., JP 05-318147, Dec. 1993.*
Hufnagel W: "Key to Aluminum Alloys, $4^{th}$ Edition", Aluminium-Schlüssel: Key to Aluminium Alloys, 1991, pp. 195-205, XP 002194851 Düsseldorf, Germany pp. 200-202.
Hufnagel W: "Key to Aluminum Alloys, $4^{th}$ Edition", Aluminium-Schlüssel: Key to Aluminium Alloys, 1991, pp. 168-170, XP 002393173 Düsseldorf, Germany pp. 169-170.
U.S. Appl. No. 11/718,686, international filing date of Nov. 10, 2005 (US National Stage of PCT/EP2005/012192, published as WO 2006/053701 on May 26, 2006).
U.S. Appl. No. 12/297,293, international filing date of Apr. 19, 2007 (US National Stage of PCT/EP2007/003450, published as WO 2007/128391 on Nov. 15, 2007).

(Continued)

*Primary Examiner* — Michael La Villa
(74) *Attorney, Agent, or Firm* — Novak Druce + Quigg LLP

(57) ABSTRACT

Automotive body sheet in the form of an aluminium composite sheet material wherein a clad sheet is applied to at least one side of a core material, and wherein the core material is of an AA6xxx-series alloy, and wherein the clad sheet includes an AA5xxx-series alloy having less than 3.6 wt. % of Mg.

8 Claims, No Drawings

OTHER PUBLICATIONS

U.S. Appl. No. 12/297,302, international filing date of Apr. 19, 2007 (US National Stage of PCT/EP2007/003447, published as WO 2007/128389 on Nov. 15, 2007).
Office action of Jan. 6, 2010 from U.S. Appl. No. 12/297,302 to De Smet et al.
Certified English traslation of paragraphs 0011 to 0027 and 0034 to 0042 of JP 05-318147 (Dec. 1993).
Office action of Sep. 15, 2010 from U.S. Appl. No. 12/297,302 to De Smet et al.
Office action of Nov. 18, 2010 from U.S. Appl. No. 12/297,302 to De Smet et al.

* cited by examiner

ALUMINIUM COMPOSITE SHEET MATERIAL

FIELD OF THE INVENTION

The invention relates to an automotive body sheet in the form of an aluminium composite sheet material in which a clad sheet is applied to at least one side of a core material.

BACKGROUND TO THE INVENTION

Composite materials in brought terms are known from the state of the art, such as for example from international application WO-01/02165. In such a composite material the core material (which determines by far the largest component of the composite material) mainly determines the bulk mechanical properties of the composite material, such as for example the strength thereof. The clad sheet however (which, consequently, only determines a small fraction of the composite material and thus will be of minor importance for the mechanical properties thereof is in contact with the environment surrounding the composite material and thus will determine the chemical activity, for example to a very large extent the corrosion performance of the composite material.

As examples of aluminium composite materials according to the state of the art firstly brazing sheet having typically an aluminium alloy from the AA3xxx-series as core material (e.g. AA3003) and on one or both sides thereof an aluminium alloy from the AA4xxx-series (e.g. AA4045 or AA4343) as clad sheet, as well as sheets for aeronautical use (core material comprising an aluminium alloy from the AA2xxx-series and clad sheet typically comprising an aluminium alloy from the AA1000-series) such as Alclad 2024-1230 may be mentioned. It is common for such known composite materials that these are developed for a specific use and for fulfilling specific demands.

U.S. Pat. No. 6,329,075-B1 discloses an aluminium alloy composite sheet having a core material of high strength and one or more claddings layers having an electrical conductivity greater then the core material for improved performance in heat exchanger applications. The core material is made from an alloy selected from the group of an AA3000, an AA6000, and an AA8000-series aluminium alloy, and the core alloy having an electrical conductivity less than 50% IACS, and the cladding is selected from the group of an AA1000 and AA7000-series aluminium alloy while having an electrical conductivity of greater than 50% IACS. The composite material is for brazing applications and can be made in any form, corrugated fin stock, tubing, headers, or any other shape that would be adapted for brazing.

International application WO-98/24571 discloses a multi-layer metal composite product obtained by compound strand casting. The product comprises a core, preferably an aluminium alloy, on at least one side of the core an interlayer bonded to the core and a cladding bonded to the interlayer. Depending on the application of the product, the cladding forming the outersurface of the composite product can be a aluminium brazing alloy for use in brazing sheet, an AA1xxx-series alloy to obtain a mirror like surface finish, or an zinc containing aluminium alloy or zinc or a zinc alloy to improve corrosion resistance.

As will be appreciated herein below, except as otherwise indicated, all aluminium alloy designations refer to the Aluminum Association designations in Aluminium Standards and Data and the Registration Records, as published by the Aluminium Association in 2006.

For this invention "sheet product" refers to a rolled product form over 0.15 mm through 2.5 mm in thickness with sheared, slit, or sawed edges.

For this invention "automotive body sheet" or "ABS" refers to aluminium alloy sheet for automotive body applications, in particular exterior panels, interior panels and structural parts.

For any description of alloy compositions or preferred alloy compositions, all references to percentages are by weight percent unless otherwise indicated.

SUMMARY OF THE INVENTION

It is an object of the present invention to provide an improved aluminium composite material of the type referred to above, which is designed for use as automotive body sheet.

This and other objects and further advantages are met or exceeded by the present invention concerning automotive body sheet in the form of an aluminium composite sheet material wherein a clad sheet is applied to at least one side of a core material, and wherein the core material consists of an AA6xxx-series alloy, and wherein the clad sheet comprises an AA5xxx-series alloy having less than 3.6 wt. % of Mg.

DETAILED DESCRIPTION OF THE PREFERRED EMBODIMENTS

The present invention provides automotive body sheet in the form of an aluminium composite sheet material wherein a clad sheet is applied to at least one side of a core material, and wherein the core material consists of an AA6xxx-series alloy, wherein the clad sheet comprises an AA5xxx-series alloy having less than 3.6 wt. % of Mg.

To date panels for use in vehicles (also referred to as Automotive Body Sheet or ABS) did use only a single aluminium alloy (and thus define what is referred to as non-clad or non-composite systems). Generally, aluminium alloys from the AA5xxx-series are used for inner panel applications, whereas aluminium alloys from the AA6xxx-series are used for outer panel and structural applications. Although by varying the chemical composition of the alloys a wide variation of mechanical properties can be achieved, not all possibilities are applied in practice. For applications in vehicles these possibilities are limited, among others, due to restrictions imposed by corrosion performance. For example, an increase of the Mg-level in AA5xxx-series aluminium alloys indeed enhances the formability as well as strength, but at the same time the corrosion performance (especially the so-called intergranular corrosion) is worsened. Likewise, in AA6xxx-series aluminium alloys, an increase of the Cu-level would adversely lead to an increased corrosion sensitivity (especially the so-called filiform corrosion) for painted surfaces, which has restricted usage of these compositions in automotive body sheet applications (inner panel, outer panel and structural applications).

Thus, although the skilled person might want to increase the Mg- and Cu-level in the aluminium sheet for increasing the mechanical properties, the subsequent reduction of the chemical properties, and the corrosion resistance in particular, does not allow it.

According to the present invention the properties of the core sheet material are disconnected from the demands imposed on the surface of the composite material. Thus, the core material can be chosen such as to meet the mechanical demands as good as possible, whereas the clad sheet can be chosen such as to meet the demands on interaction with the environment. It has been found that a combination of a core material of an aluminium alloy from the AA6xxx-series with a clad sheet of an aluminium alloy from the AA5xxx-series with less than 3.6 wt. % Mg and thereby forming the aluminium composite sheet material can meet such demands.

Furthermore, in vehicles adhesive bonding of automotive body sheets occurs, regulated by specific requirements (although not as stringent as is the case in the aeronautical field). While a non-composite system needed an adequate pre-treatment of its surface, it appears that the composite sheet material according to the present invention does not need so to obtain a sufficient durability as this is already provided for by the choice of the clad layer.

Whereas as an example of aluminium core alloy from the AA6xxx-series the aluminium alloy AA6016 may be mentioned in particular. Other suitable AA6xxx-series core alloys are those having a Cu-content up to 1.1 wt. %, and preferably up to 0.9 wt. %, in particular AA6111, AA6013, AA6022 and the AA6056-series alloy.

These alloys are extremely well-fitted for the intended use in the automobile field because of their specific properties, which per se are well known to the skilled person.

The core is clad with an aluminium alloy from the AA5xxx-series with less than 3.6 wt. % of Mg, amongst others to obtain a good intergranular corrosion resistance, particularly suitable alloys are chosen from the AA5754, AA5051A or AA5018-series alloys.

The composite sheet product in accordance with the present invention may comprise only one clad sheet applied to only one side of the core material. In another embodiment a clad sheet is applied to both sides of the core material. As a result, the composite material exhibits excellent balanced properties, viz. strength and formability versus corrosion performance, dent resistance and hemming performance.

Although the dimensions of the aluminium composite material can be varied in many ways (mostly imposed by the specific use and concurrent demands), for use as automotive body sheet the core material has a thickness in the range of about 0.5 to 2 mm, preferably about 0.7 to 1.3 mm, and most preferably about 1 mm. The clad sheet or clad sheets are usually much thinner than the core sheet, each clad sheet constituting about 1 to 25% of the total composite sheet thickness. A clad layer more typically constitutes around about 1 to 12% of the total composite sheet thickness.

In a further aspect of the invention it relates to an automotive body panel and automotive structural parts made from the automotive body sheet in the form of a composite sheet material according to this invention.

In a further aspect the invention relates to a method for producing an aluminium composite material in which a clad sheet is applied to at least one side of a core material. In accordance with the present invention the core material comprises an aluminium alloy from the AA6xxx-series, and wherein the defined clad sheet is attached to the core material by means of roll bonding to achieve the require metallurgical bonding between the core sheet and the cladding.

Such a roll bonding process is very economic and results in a very effective composite sheet material presenting the desired properties.

Of course, the roll bonding process may be accompanied by several additional processing steps such as for example annealing for determining the final properties of the automotive body sheet in the form of the composite sheet material.

When carrying out such a roll-bonding process for producing the sheet material according to the present invention, it is preferred that both the core material and clad sheet experience a thickness reduction during the role bonding.

For example the core material initially can be an about 400 mm thick block with at both sides a clad sheet initially about 24 mm thick. After roll bonding the final width of the core material was about 1 mm, whereas the final thickness of the clad layer is, for example, about 60 μm or about 40 μm.

It is noted that the initial dimensions and final dimensions of the composite sheet product will be determined both by the specifics of the roll-bonding process as well as the required properties of the final sheet product.

The roll bonding process can be carried out in different manners. For example, it is possible that the roll-bonding process includes both hot rolling and cold rolling.

Further, the roll-bonding process may be a one-step process or a multi-step process in which during successive rolling steps the material is gauged down. Separate rolling steps then may be separated by other processing steps, for example annealing steps, heating steps, cooling steps, etc.

In another embodiment according to this invention the defined cladding sheet is attached to the core material by means of a casting technique, for example as disclosed in EP-1638715, incorporated herein by reference.

As expressed above and set forth in the claims, the aluminium composite material in accordance with the present invention is for use as automotive body sheet in vehicles. The choice of the core material from the AA6xxx-series leads to excellent mechanical properties as these are substantially determined by the core sheet, and which are at least comparable with standard industrial sheet alloys used for this application. Tests conducted on specimens of the aluminium composite sheet material according to the present invention has showed further that there is no significant correlation between the thickness of the clad sheet and the mechanical properties, thus confirming what has been stated above with respect to disconnecting the bulk properties of the core material from the demands imposed on the clad sheet. The invention will now be illustrated with reference to non-limiting embodiments according to the invention.

Example 1

On an industrial scale two sheet products have been manufactured and processed to sheet product of 1 mm in a T4P temper. The two sheet products were a bare AA6016 alloy and an AA6016 alloy clad on both sides with an AA5051A alloy. The AA6016 is used for automotive body sheet applications. The core of the clad sheet product has the same thermal history as the bare sheet product, for example both have been subjected to a homogenisation treatment of 10 hours at 560° C. The clad sheet product was made using common roll bonding practices of hot-rolling the clad product to an intermediate gauge of 7.5 mm and whereby the hot-mill exit temperature was about 300° C., and then cold rolled to a final gauge of 1 mm. The clad sheet had a total thickness of 1 mm and each clad layer had a thickness of 40 μm.

The exact alloy compositions of the AA6016 and AA5051A are listed in Table 1. All products have been solution heat treated at 560° C. and then quenched, and within 1 hour re-heated to about 80° C. followed by coil cooling to room temperature and then after 2 weeks at room temperature tested while being in the so-called T4P-temper for its strength, total elongation and hemming performance. The strength, intergranular corrosion resistance and dent-resistance have been measured after a simulated forming and paint-bake cycle whereby the product in the T4P-temper is further subjected to a 2% cold stretch following by a heat-treatment of 20 minutes at 185° C.

Both the bare sheet product and the clad sheet product have been tested in the T4P condition for their hemming performance via a flat hemming test (bending the samples 180° with a bending radius of 0.0 mm as included in ASTM norm E290-97A) and followed by a visually assessed. A score was given according to the following rating: rating "5" represents no visual defects, "4" mild surface roughening, "3" severe surface roughening, "2" small surface cracks, and "1" represents continuous surface cracks, and whereby a further sub-rating of for example 3¼, 3½ and 3¾ is used.

Both the bare AA6016 sheet product and the AA6016 clad with AA5051A have been assessed for their mechanical properties according to ASTM norm EN10002 for tensile tests. The tensile properties have been determined in the referenced T4P-temper and also after a simulated forming and paint-bake cycle. The intergranular corrosion resistance ("IGC") after the simulated forming and paint-bake cycle have been measured according to the European norm ASTM G110-92 and the result is expressed in penetration depth in μm. In addition the static dent-resistance after the simulated forming and paint-bake cycle has been measured whereby the product is mounted and subsequently loaded with a steel indentor having a radius of 63.5 mm with a speed of 2 mm/min, such that from the force-displacement curve the static dent-resistance $F_{0.1mm}$ is determined as the force (in N) required to make an indention of 0.1 mm deep. The test results are listed in Table 2.

TABLE 1

Alloy composition in wt. % of the AA6016 and AA5051A, balance aluminium and inevitable impurities.

| Alloy | Si | Fe | Cu | Mn | Mg | Cr | Ti |
|---|---|---|---|---|---|---|---|
| AA6016 | 1.0 | 0.23 | 0.15 | 0.07 | 0.60 | 0.03 | 0.02 |
| AA5051A | 0.1 | 0.2 | 0.02 | 0.05 | 1.85 | 0.15 | 0.02 |

TABLE 2

Test results of the bare AA6016 alloy sheet and the alloy sheet clad with AA5051A.

| Property and condition | Bare AA6016 | AA6016 with AA5051A clad |
|---|---|---|
| Yield strength (MPa) in T4P | 141 | 136 |
| Total elongation (%) in T4P | 23.8 | 24.3 |
| Hemming in T4P | 1½ | 33¼ |
| Yield strength after 2% + 185° C./20 min | 258 | 242 |
| IGC (μm) after 2% + 185° C./20 min | 118 | 23 |
| Dent-resistance $F_{0.1\,mm}$ (in N) after 2% + 185° C./20 min | 260 | 246 |

Furthermore, very advantageously it has been found that the susceptibility to roping has been completely suppressed by using the defined 5xxx-series cladding, whereas it is known that bare 6xxx-series alloy used for automotive body-sheet applications are susceptible for this undesired phenomenon. This is in particular advantage for the sheet product according to this invention when used for automotive exterior body panels.

From the results of Table 2 it can be seen that although the dent-resistance is slightly reduced in the sheet product according to this invention, the formability remains unchanged, whereas the corrosion resistance is significantly improved and also the hemming performance is improved.

In the present example the core alloys have been clad on both sides for practical reasons in the production thereof, but it will be immediately apparent to the skilled person that the same benefits can be obtained by using only a single clad sheet or clad layer.

This example illustrates the principle of the present invention that the hemming performance of an AA6000-series alloy suitable for automotive body sheet can be improved by providing it with a suitable cladding layer thereby also obtaining a significant improvement in the corrosion resistance, while still benefiting from the favourable characteristics of the core sheet such as its strength, formability, the paint bake response and dent resistance. And very importantly, the AA6000 core alloy is no longer susceptible to roping.

The invention is not limited to the embodiments described before, which may be varied widely within the scope of the invention as defined by the appending claims.

The invention claimed is:

1. Automotive body sheet in the form of an aluminum composite sheet material, consisting of a core sheet having a clad sheet on both surfaces,
   wherein the core material consists of an AA6xxx-series alloy selected from the group consisting of AA6016 and AA6022-series alloy, and
   wherein the clad sheet consists of an AA5xxx-series alloy having less than 3.6 wt. % of Mg, the clad sheet consisting of an aluminum alloy selected from the group consisting of AA5754, AA5051A, and AA5018-series alloy.

2. Sheet material according to claim 1, wherein the core material has a thickness in a range of 0.5 to 2 mm.

3. Sheet material according to claim 2, wherein the core material has a thickness in a range of 0.7 to 1.3 mm.

4. Sheet material according to claim 1, wherein the clad sheets on both surfaces are made from the same AA5xxx-series alloy.

5. Sheet material according to claim 1, wherein one or both clad sheets have a thickness in a range of 1 to 25% of the total thickness of the composite sheet material.

6. Sheet material according to claim 1, wherein one or both clad sheets have a thickness in a range of 2 to 12% of the total thickness of the composite sheet material.

7. Automotive body panel made from the automotive body sheet according to claim 1.

8. Sheet material according to claim 1, wherein the core material consists of AA6016 and the clad sheet consists of AA5051A.

* * * * *